(12) United States Patent
Nye

(10) Patent No.: US 11,082,327 B2
(45) Date of Patent: Aug. 3, 2021

(54) SYSTEM AND METHOD FOR COMPUTATIONAL TRANSPORT NETWORK-ON-CHIP (NOC)

(71) Applicant: ARTERIS, INC., Campbell, CA (US)

(72) Inventor: Jeffrey L. Nye, Austin, TX (US)

(73) Assignee: ARTERIS, INC., Campbell, CA (US)

( * ) Notice: Subject to any disclaimer, the term of this patent is extended or adjusted under 35 U.S.C. 154(b) by 43 days.

(21) Appl. No.: 16/506,871

(22) Filed: Jul. 9, 2019

(65) Prior Publication Data
US 2020/0213217 A1  Jul. 2, 2020

Related U.S. Application Data

(60) Provisional application No. 62/786,345, filed on Dec. 29, 2018.

(51) Int. Cl.
| | |
|---|---|
| *H04L 12/751* | (2013.01) |
| *G06F 15/78* | (2006.01) |
| *G06N 3/08* | (2006.01) |
| *H04L 12/727* | (2013.01) |

(52) U.S. Cl.
CPC .......... *H04L 45/08* (2013.01); *G06F 15/7825* (2013.01); *G06N 3/084* (2013.01); *H04L 45/121* (2013.01)

(58) Field of Classification Search
None
See application file for complete search history.

(56) References Cited

U.S. PATENT DOCUMENTS

| | | | |
|---|---|---|---|
| 2009/0161576 A1* | 6/2009 | Morris | H04L 61/6068 370/254 |
| 2013/0176850 A1* | 7/2013 | Mishra | H04L 12/46 370/235 |
| 2014/0376569 A1* | 12/2014 | Philip | H04J 3/0658 370/503 |
| 2017/0201323 A1* | 7/2017 | Prakash | H04Q 11/0001 |
| 2018/0367958 A1* | 12/2018 | Dizdarevic | G08G 1/091 |
| 2019/0065188 A1* | 2/2019 | Shippy | G06F 9/3887 |
| 2020/0021397 A1* | 1/2020 | Fruehling | H04L 1/0083 |
| 2020/0104491 A1* | 4/2020 | Boulton | G06F 21/51 |
| 2020/0104691 A1* | 4/2020 | Bai | G06N 3/0454 |

\* cited by examiner

*Primary Examiner* — Saumit Shah

(57) ABSTRACT

A system and method are disclosed for performing operations on data passing through the network to reduce latency. The overall system allows data transport to become an active component in the computation, thereby improving the overall system latency, bandwidth, and/or power.

13 Claims, 7 Drawing Sheets

SYSTEM AND METHOD FOR COMPUTATIONAL TRANSPORT NETWORK-ON-CHIP (NOC)

CROSS REFERENCE TO RELATED APPLICATIONS

The present invention claims the benefit of U.S. Provisional Application Ser. No. 62/786,345 titled SYSTEM AND METHOD FOR COMPUTATIONAL TRANSPORT NETWORK-ON-CHIP (NoC) field on Dec. 29, 2018 by Jeffrey L. NYE, the entire disclosure of which is incorporated herein by reference.

FIELD OF THE INVENTION

The invention is in the field of computer systems and, more specifically, for network-on-chip (NoC) designs.

BACKGROUND

Multiprocessor systems have been implemented in networks-on-chips (NoCs). The NoC includes processor intellectual properties (IPs), memory controller IPs, and cache coherent system IPs connecting the processors and memory controllers. NoCs are efficient mechanisms for data movement. To date, what has not been widely exploited is the utilization of NoC elements, such as adapters/switches/pipestages, to perform computation on the data passing through the NoC, beyond error correction and resiliency. Data movement is necessary but also expensive in terms of power consumption, latency, throughput, etc., i.e. system visible characteristics that shape the effectiveness of the system.

Therefore, what is needed is a system and method for performing operations on data as it passes through the network, such that the overall system latency, bandwidth, and/or power are improved.

SUMMARY OF THE INVENTION

In accordance with various aspects and embodiments of the invention, a system and method are disclosed for performing operations on data passing through the network thereby improving the overall system latency, bandwidth, and/or power are improved. The overall system allows data transport to become an active component in the computation. The overall system is made more efficient, for example by reducing latency and by increasing effective parallelism. Various aspects and embodiments of the invention may be implemented in artificial intelligence, high performance computing (HPC), cellular (base band) processing, cellular handset multi-media platforms, data center offload, image recognition and understanding, sensor data aggregation, including sensor systems for driver assist or driverless vehicles.

BRIEF DESCRIPTION OF THE DRAWINGS

The invention is described in accordance with the aspects and embodiments in the following description with reference to the figures (FIGs.), in which like numbers represent the same or similar elements.

DETAILED DESCRIPTION

Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Figure 1A:
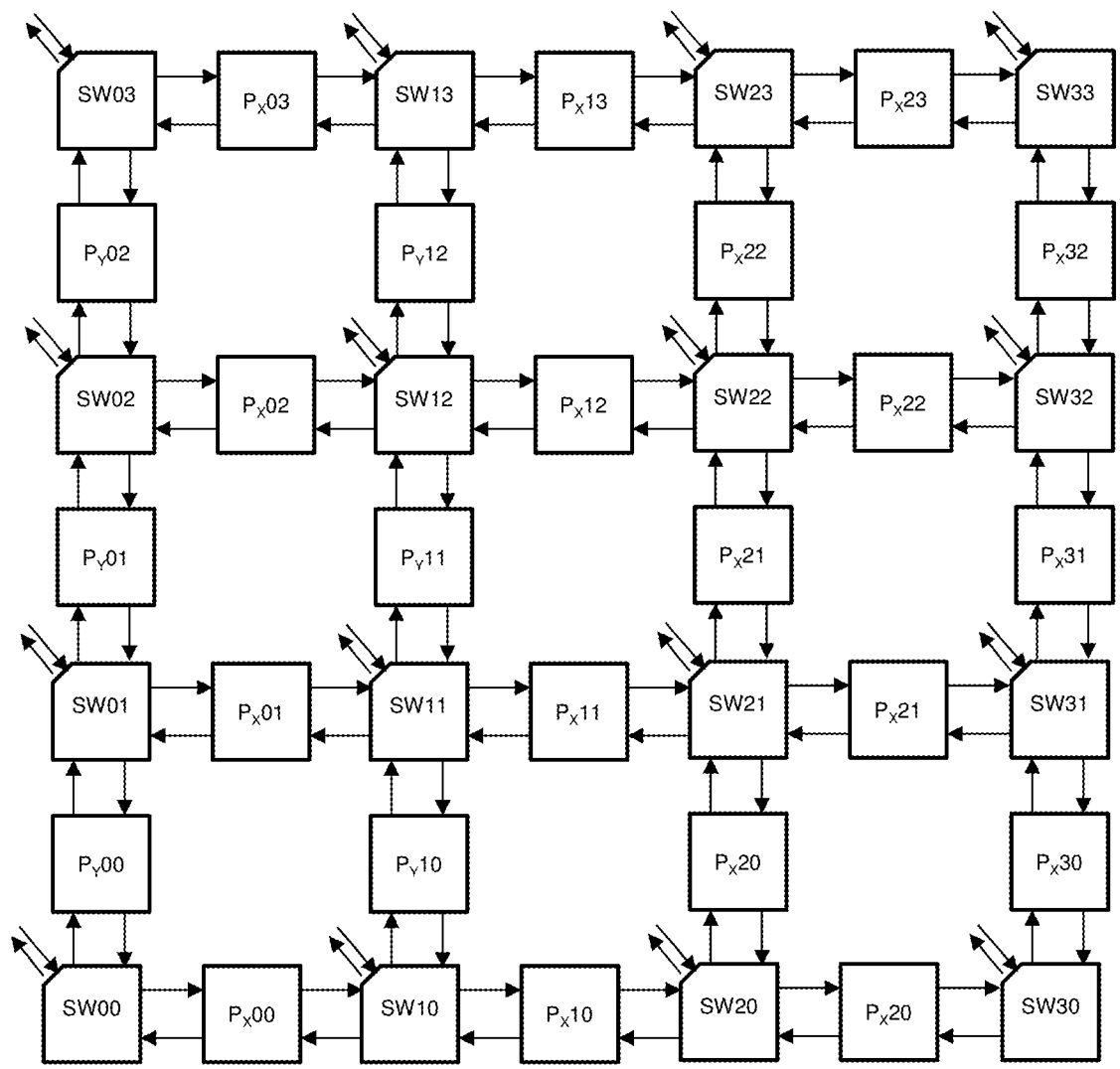
FIG. 1A shows a block diagram of a network-on-chip (NoC) system in accordance with the various aspects and embodiments of the invention.

Referring now to FIG. 1A, a transport network is shown that is connected as a mesh with bidirectional traffic between elements, wherein "SW" are switches with labels showing their X/Y position in the mesh. Px are pipe stages in the X direction, Py are pipe stages in the Y direction and CPUs (not shown) are connected to the switches on the diagonal connections. A transport network is a component of a system that provides standardized interfaces to other components and functions to receive transaction requests from initiator components, issue a number (zero or more) of consequent requests to target components, receive corresponding responses from target components, and issue responses to initiator components in correspondence to their requests. A transport network, according to some embodiments of the invention, is packet-based. In accordance with some embodiments of the invention, a packet based transport network supports both read and write requests. Based on the protocol implemented, there may be a response to a message; in some protocols messages do not have a response.

In accordance with some embodiments multi-party transactions are used such that initiating agent requests go to a coherence controller, which in turn forwards requests to other caching agents, and in some cases a memory, and the agents or memory send responses directly to the initiating requestor. In accordance with some embodiments of the invention, the transport network supports multicast requests as a single request, address some or all of the agents and memory.

The transport network, in accordance with some aspects and some embodiments of the invention, is a network-on-chip (NoC), though other known means for coupling interfaces on a chip can be used and the scope of the invention is not limited thereby. The transport network provides a separation of the interfaces between the agent interface unit, coherence controller, and memory interface units, such that they may be physically separated.

According to some embodiments the transport network is dedicated to coherence-related communication and in other embodiments at least some parts of the transport network are used to communicate non-coherent traffic. In accordance with some embodiments of the invention, the transport network handles both coherent related communication and non-coherent communication and coherent and non-coherent traffic can co-exist within the same portions of the network. In accordance with some embodiments of the invention, the transport network is NoC with a grid-based mesh or depleted-mesh type of topology. In accordance with some embodiments of the invention, a NoC uses virtual channels. The NoC that couples the units is a means of communication that transfers at least all semantic information necessary, between units.

In accordance with the present invention, the NoC is a network-based communication subsystem on an integrated circuit or micro-chip. The NoC includes elements and wires that are links and connect elements. Elements of the NoC are customized during the NoC design phase and computation hardware and support circuitry are added to the elements. Examples of hardware that are added include, but are not limited to, adders, multipliers, comparators, buffers, muxes, control store, state machines, etc. In addition, associations between specific data, specific NoC elements and specific computation operations are designed during the NoC design phase. In accordance with one aspect of the invention, the association is static. In accordance with one aspect of the invention the association is dynamically modified through packet traffic or side band control signals. In accordance with one embodiment, a register set in each element that contained tags and comparison logic to enable the computation hardware. The NoC design phase also defines routing mechanisms that guide data through the NoC elements, which perform the operations required.

A high level of parallelism is achieved, because data links in the NoC can operate simultaneously on different data packets. Therefore, as the complexity of integrated systems keeps growing, a NoC provides enhanced performance, such as throughput and scalability for communication as data passes through the NoC.

Data passing through the NoC is tagged. For example, in accordance with some aspects of the invention, data is contained in messages. In accordance with some aspects of the invention, data is contained in packets. In accordance with some aspects of the invention, data is contained in flits. In accordance with some aspects of the invention, data is contained in phits. The scope of the various embodiments of the invention are not limited by the sample list set forth. The tagging mechanism can be side-band or any field in the data. In accordance with one embodiment of the invention, tags are in the packet/message header sourced by the initiator. In accordance with an embodiment of the invention, in each computationally enabled NoC element, the tags in the data are coupled with an operation that is performed by the computation hardware. In accordance with some aspects of the invention, more than one tag can be assigned to an operation. Data from different packets can share hardware resources. In accordance with an aspect of the invention, more than one operation can be assigned to a tag. Data with a specific tag can have a series of operations performed. In accordance with an aspect of the invention, tag and operation associations can differ between NoC elements.

The system and method described is flexible. In accordance with one embodiment, a system uses a single tag and computation association, such that all data in all NoC elements have the same operations performed.

Figure 1B:
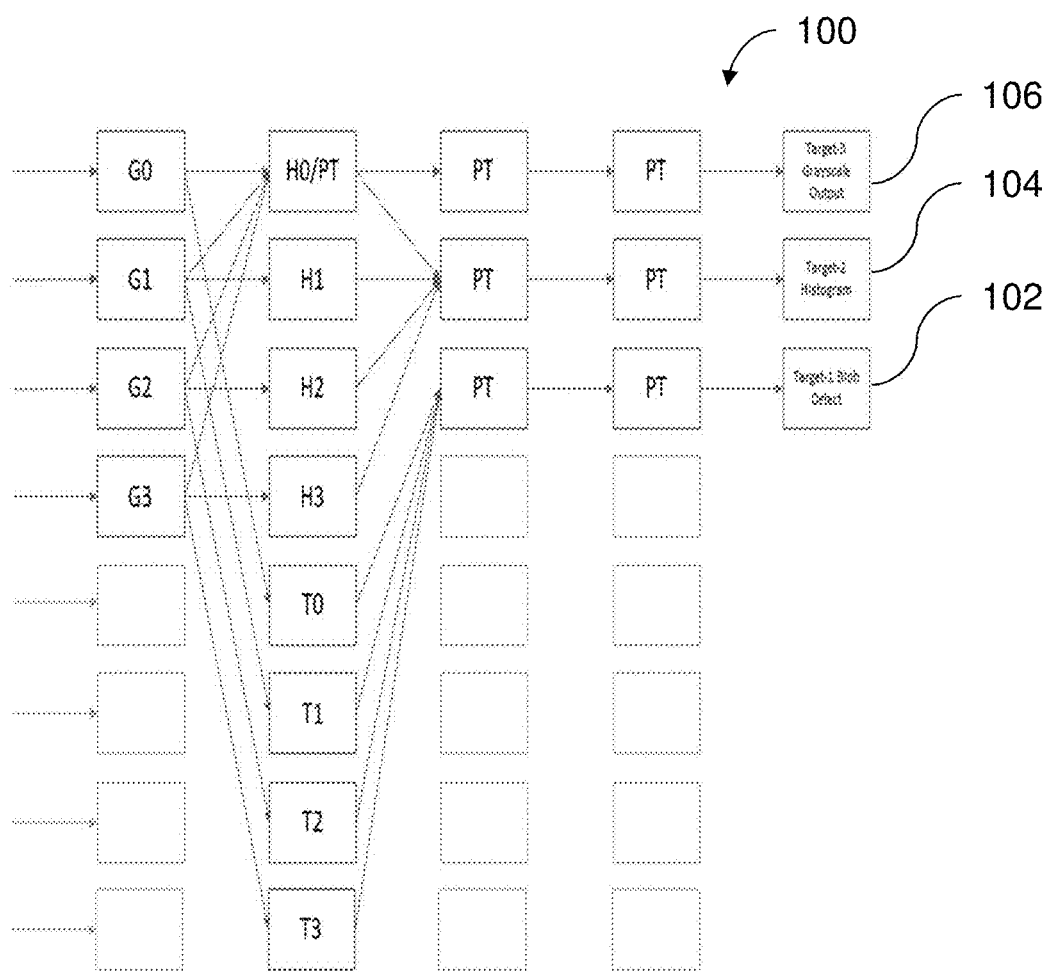
FIG. 1B shows a portion of a NoC in accordance with the various aspects and embodiments of the invention.

Referring to FIG. 1B, a NoC system is shown with target 102, target 104, and target 106. Connections for conventional NoC functions are implied, but not precluded, and initiators and data stream sources are not shown. Targets 102, 104, and 106 capture three separate data streams. Target 102 consumes binary image data. Each bit represents one pixel. Target 104 consumes tables of histogram data. Each entry in a table contains the total number of pixels of that value found in the image frame. Target 106 is a grey scale camera output device.

NoC elements G0-G3 receive 32 bit color pixel data in AARRGGBB format and perform color space conversion on all tagged incoming data as follows:

$$\text{output}=(RR>>2)+(GG>>1)+(BB>>2);$$

The NoC elements G0-G3 have an egress port that feeds [H0/PT, H1, H2, H3] as shown. H0/PT receives a feed from G0-G3. The color space conversion process converts 4 bytes of data to 1 byte of data. In accordance with an embodiment of the invention, the overload of H0/PT (pass through) illustrates the benefit of the in-NoC data reduction. NoC elements H0-H3 perform histogram calculations on the incoming gray scale 8 bit pixels. In pseudo code form, each pixel is an input to a LUT containing the histogram:

```
unsigned char lut[256];
void updateLUT(unsigned char pixel) {
    lut[pixel] = lut[pixel]+1;
}
```

In accordance with an aspect of the invention, in hardware terms this is a RAM 256 entries by 8 bits, an 8 bit pipe-stage and an 8 bit adder and support circuitry. NoC elements H0-H3 do not output individual pixels. Once a LAST flag 35, of FIG. 3, has been detected NoC elements H0-H3 transmit their histogram tables to Target 104. The LAST flag 35 indicates that this packet is the last packet of a message. The NoC elements G0-G3 also have an egress port that feed NoC elements T0-T3. The NoC element T0-T3 perform gray scale to binary conversion. A threshold limit is resident in each of the NoC elements T0-T3. In accordance with one embodiment of the invention, the limit can be transmitted with the packet header. In accordance with one embodiment of the invention, the limit can be written to the NoC elements via a configuration NoC. In pseudo code form, for clarity assuming the egress port of each T0-T3 is 8 bits wide:

```
unsigned char threshold; //initialized by an initiator message for example
unsigned char buffer = 0;
unsigned char pos = 0;
void processPixel(unsigned char pixel) {
```

```
unsigned char bit = pixel <= threshold ? 0 : 1;
  buffer |= bit << pos++;
if(pos > 7) {
moveToEgress(buffer);
buffer = 0;
pos = 0;
}
```

The step "moveToEgress( )" represents the process of transmitting the value to Target-1 Blob Detect 102. In accordance with an embodiment of the invention, in terms of hardware there is a pipestage, 8 bit comparator, shifter or mux network, OR gate, an 8 bit register for buffer and possibly a 9 bit register for pos, such as self-clearing.

The process of conversion from grey scale to binary is a data reduction step, 8 to 1, which can be advantageous, and the use of a common NoC element to receive the threshold data in the block diagram is intended to show this benefit.

The block diagram is one possible implementation and has been created to assist the description. The scope of the present invention is not limited by the combinations of functions and assignments, as shown in FIG. 1B. For example, in some systems it would be possible to merge the Gx/Hx/Tx functions into one element, wherein "x" represents the values 0-3 for the elements G0-G3, H0-H3, and T0-T3.

In accordance with an embodiment of the invention, the common reduction operation illustrates the concept of using NoC elements to improve system performance by hiding the time required for the calculations or using the NoC as an off-load mechanism to reduce the computation burden of processing elements. The reduction example used here performs the sum on an array and stores the result.

```
int sum = 0;
int* loadAddr = 0x112233;
int* storeAddr = 0x445566;
for(int row=0;row <Rows; row++) {
int val = *loadAddr++;
sum += val;
}
*storeAddr = value;
```

In a multiprocessor system using the OpenMP API, the code might look as shown below, with the load and store abstracted for clarity:

```
#pragma omp parallel for private(val) reduction(+:sum)
  for (row = 0; row < Rows; row++)
  {
  sum += val;
  }
```

The OpenMP runtime support library then distributes this function across the threads in the work group. Sections of the for-loop are executed in parallel on the data forming a private sum result in each element of the work group. The final result is then formed by summation of the discrete sum values at a chosen destination.

OpenMP presumes shared memory semantics. Each element of the work group is then accessing shared storage and performing the local calculation and updating the sum value stored in a register or local memory.

Figure 6:
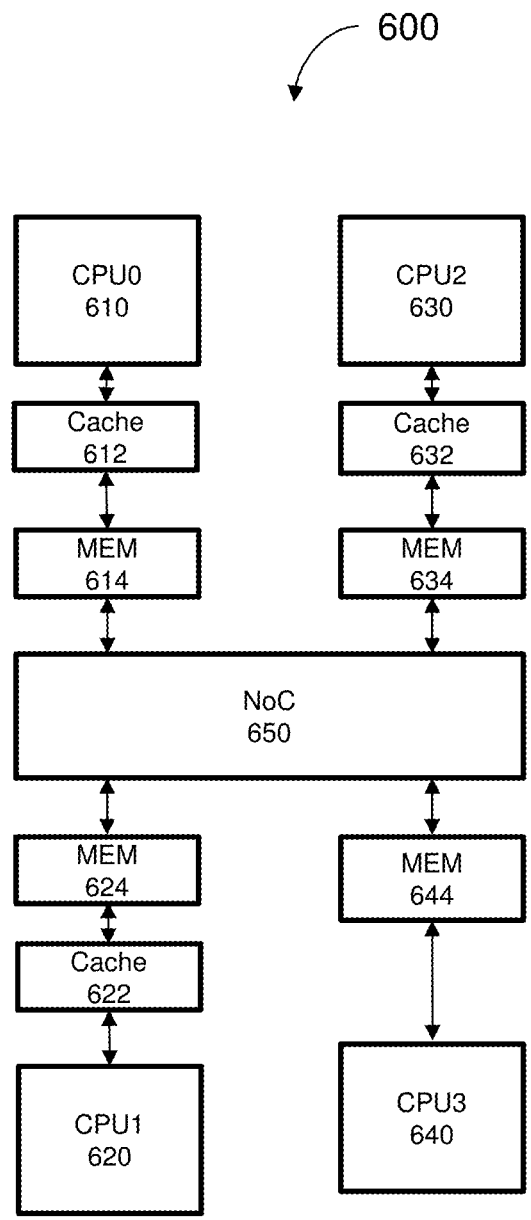
FIG. 6 shows a multi-core system with coherent and non-coherent processors communicating with a NOC in accordance with the various aspects and embodiments of the invention.

Referring now to FIG. 6, in accordance with an embodiment, a 4-processor system 600 is shown. The system 600 includes a processor or CPU0 610, a processor or CPU1 620, a processor or CPU2 630, and a processor or CPU3 640. In accordance with various aspects and embodiments of the invention, the system 600 includes coherent and non-coherent processors. The system 600 includes: cache 612, 622, and 632; memory (MEM) 614, 624, 634, and 644; NoC and 650. The CPU3 940 performs the final reduction and stores the result to bulk memory. Each processor reads from a shared memory, performs add/accumulate operation and updates its local state. When the local for-loop terminates, then the processor stores the final value, depending on the memory subsystem, either to a shared memory or directly in the CPU3 640. Once the CPU3 640 is notified that all sub-processes have completed, the CPU3 640 performs the final summation and stores the result.

In accordance with the various embodiments of the invention, the data movement is enough to perform the reduction. In accordance with an embodiment, a processor performs a configuration action on a NoC element to perform the summation and write back the result. In accordance with an embodiment of the invention, the NoC element receives a control message that states all data with a specific ID is to have the reduction summation performed. The NoC element is instructed to write back the summation value when the last phit of the message is received. In accordance with the various aspects of the invention, reduction is a process used for illustrating the concept. The scope of the invention is not limited thereby.

Another example, in accordance with an embodiment of the invention, is thresholding, which is a common preconditioning function in image recognition. Data is moved to a region or blob detection accelerator. Gray scale image regions are converted to binary images through a thresholding process before processing for blob detection. This can be done during the transfer process in accordance with the various aspects of the invention using in-NoC processing concept. The NoC element is programmed with the threshold value, using the non-data payload section. Data received by the NoC element with the proper ID is compared to the stored threshold value and converted to 1 or 0 as necessary. Each bit of resulting threshold data is packed into the appropriate transport width before transmission to the destination.

Figure 2:
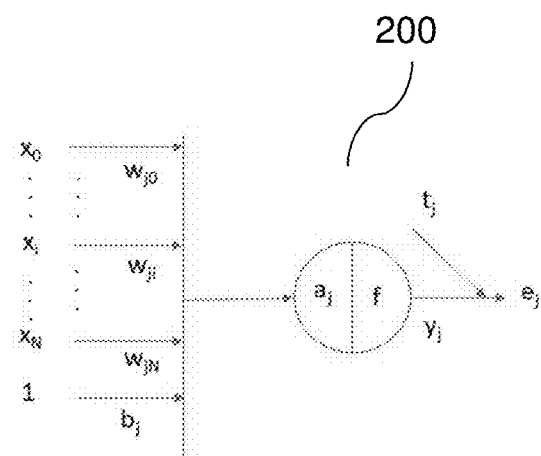
FIG. 2 shows a NoC element in an Artificial Neural Network in accordance with the various aspects and embodiments of the invention.

In the context of Artificial Neural Networks (ANN), the delta rule is implemented in a NoC element in accordance with an embodiment of the invention. Referring now to FIG. 2, the NoC includes a NoC elements 200. Weights ($w_{j0}$, $w_{ji}$, $w_{jN}$) are stored in the NoC element 200 or sent in the packet header. The weights are modified and stored locally. As data moves through the NoC element 200, the outputs are modified by weights, in flight. In accordance with the various embodiments of the invention, the input values $\{x_0-x_N, 1\}$, may be stream based, presented to the NoC element serially, or presented in parallel. The scheme described here includes a message to the NoC elements that causes the elements to report their updated weights. In accordance with an embodiment the message or command is in message form, via side band signals, or through a secondary NoC created to access NoC elements directly.

Examples of AI frameworks that include machine learning are: TensorFlow, CNTK (or Microsoft Cognitive Toolkit), Caffee, Keras, Torch. Examples of parallel computing application include: OpenMP, Cilk, OpenCL, CUDA. Examples of high performance computing (HPC) include: Hadoop, BLAS/LAPACK.

Figure 3:
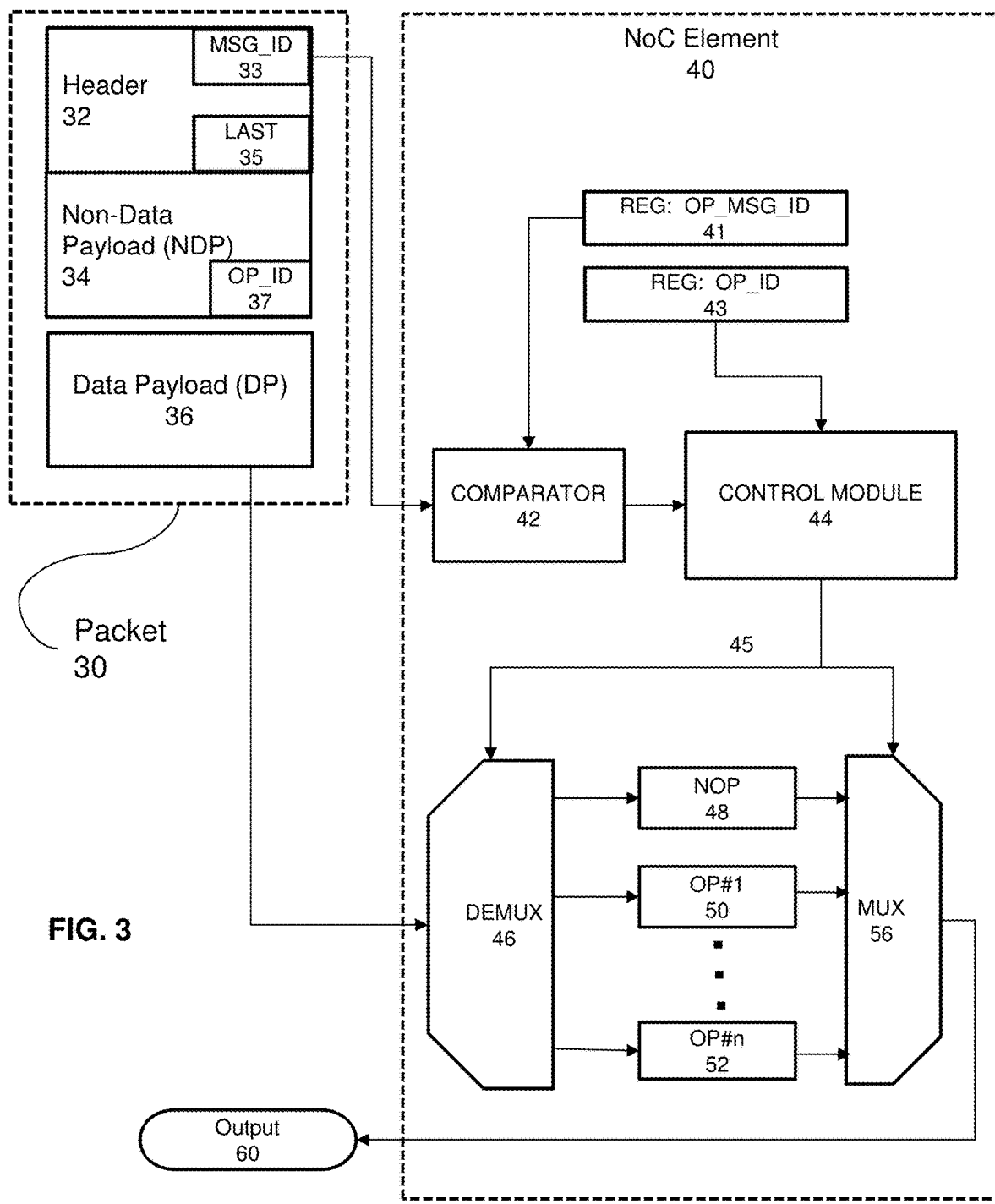
FIG. 3 shows a system with a message packet and a NoC element in accordance with the various aspects and embodiments of the invention.

Referring now to FIG. 3, a NoC element and a message packet 30 are shown in accordance with an embodiment of the invention. The packet 30 includes a header 32, a non-data payload 34, and a data payload 36. The header 32 includes a message identification, MSG_ID 33 and LAST flag 35. The MSG_ID 33 is used to determine if the packet 30 is the type of packet, upon which, an operation will be performed by the NoC element 40 as part of the transport process through the NoC. The non-data payload includes an operation identification, OP_ID 37. The OP_ID 37 is used to determine what operation is performed on the data payload 36.

The NoC element 40 includes a register (REG) for storing a message identification for identifying the message that will be operated upon during transport, based on a specific message identification, such as REG: OP_MSG_ID 41, which matches the MSG_ID 33 of the packet 30. The NoC element 40 includes the operation to be performed that is stored in a register, such as REG: OP_ID 43, during the transport process. The NoC element 40 includes a comparator 42 and a control module 44. The control module is in communication, through path 45, with a DEMUX 46 and a MUX 56. The outputs of the DEMUX 46 are connected to different operation paths, such as OP #1 50 through OP # n 52, through to the MUX 56 and output 60.

The comparator 42 performs a compare operation that compares the MSG_ID 33 with the register REG: OP_MSG_ID 41 to determine if there is a match. If no match is signaled by compare operation of the comparator 42 to a control module 44, the control module 44, which provides control signals 45 and routes the data, provides control signals 45 to DEMUX 46 and MUX 56 that the data payload is to be directed through the no operation path NOP 48.

If a match is signaled by comparator 42 to control module 44, the control module 44 signals the DEMUX 46 and the MUX 56 that the data payload is to be directed through the path as specified by the contents of register REG: OP_ID 43, which represent the operation to be performed. The contents of register REG: OP_ID 43 is used as the select values for the DEMUX 46 and the MUX 56. This select value ensures the data payload is directed through the operation path OP #1 50 through OP # n 52, as indicated by the contents of REG: OP_ID 43.

The data payload 36 is sent to a demultiplexing unit (DEMUX) 46. There is also a no operation path, NOP 48 path, between the DEMUX 46 and MUX 56. The signal from the decision unit or control module 44 determines the operation that is performed on the packet 30. Depending on the signal, which is sent from the control module 44 to both the DEMUX 46 and a multiplexer (MUX) 56, the output of the MUX 56 includes the operation performed on the data payload 36 or the data payload 36 may have been passed through the NOP 48 path. Thus, in accordance with one embodiment of the invention, the output 60 may be the result of the operation, identified as OP_ID performed on the data payload 36 during transport through the NoC. If the operation is performed on the data payload 36, then the packet 30 is modified to reflect that the operation was performed.

Figure 4:
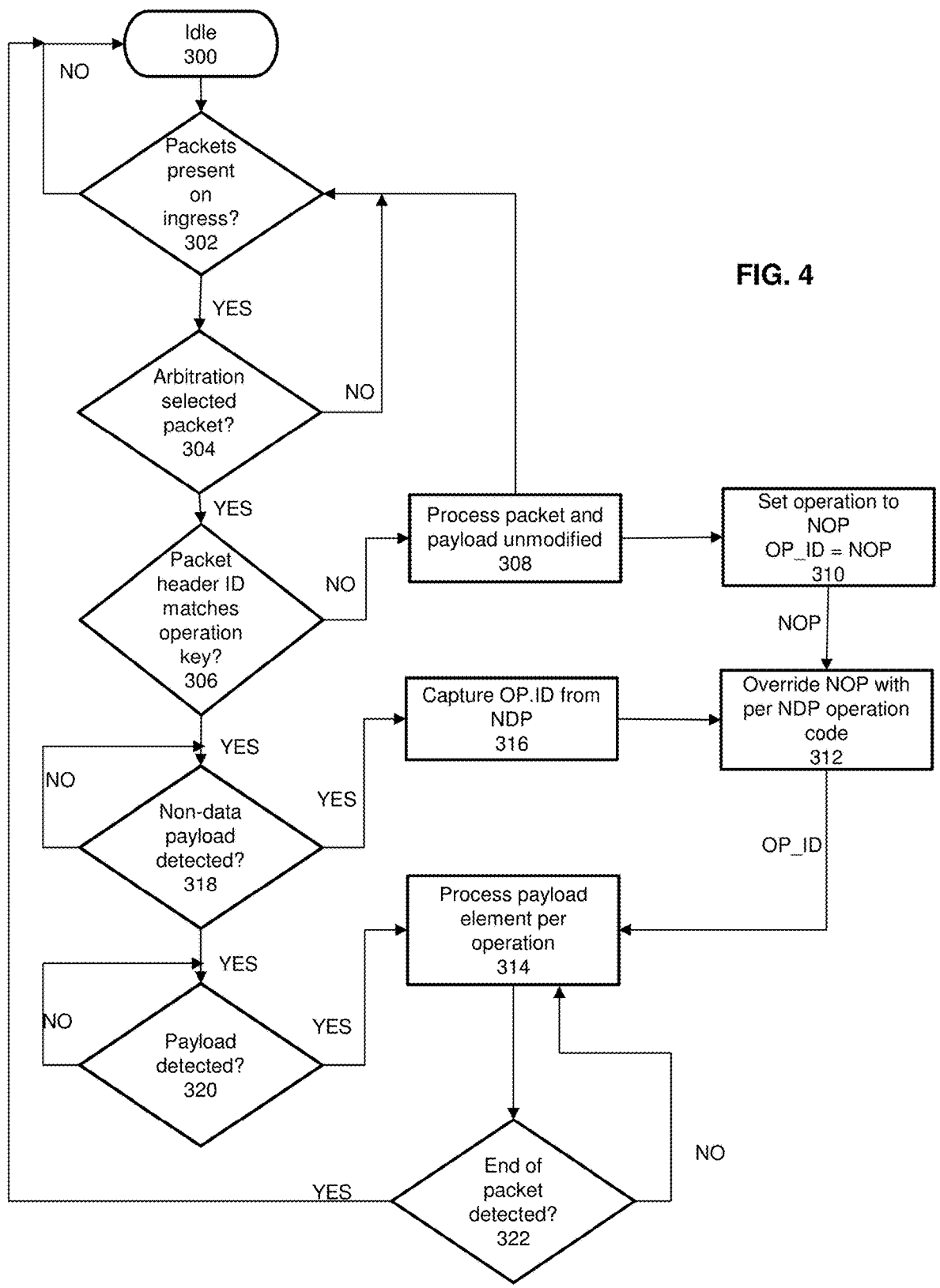
FIG. 4 shows a process for performing operation on data passing through the NoC in accordance with the various aspects and embodiments of the invention.

Referring now to FIG. 4, the process is idle at 300. At 302 the NoC element determines if there are packets present on the ingress. If no packet is present, then the process return to idle state 300. If a packet is present, then the process continues to step 304 and arbitration determines if a packet is selected for transport. If a packet is selected, then at step 306, the packet header MSG_ID 33, of FIG. 3, is compared to determine if it matches the operation key stored in the NoC element 40. If a packet header does not match and an operation key is not selected, then at step 308, the packet is passed unmodified. At step 310 the operation is set to OP_ID=NOP. At step 312, the process overrides the NOP per the non-data payload (NDP) operation code.

If there is a match at step 306, then at step 318 the non-data payload (NDP) portion or section of the packet is detected. Upon detection of the non-data payload, which includes the operation identification OP_ID 37, the process continues to step 316 to capture the OP_ID from the NDP. Then the process continues to step 312, wherein the NDP operation code, OP_ID 37, is overridden. Also, at step 318 when the NDP is detected, the process moves to step 320 to detect the data payload (DP). Upon detection of the DP, the process moves to step 314 and the DP is processed, per the operation identified by OP_ID 37, by the NoC element 40. Upon processing the data payload 36, the process moves to step 322 to determine if the end of the DP 36 is detected. If not, then the process returns to step 314 to further process the DP 36 of the packet 30. If at step 322 the end of the DP 30 of the packet 30 is detected, then the process returns to step 300.

Figure 5:
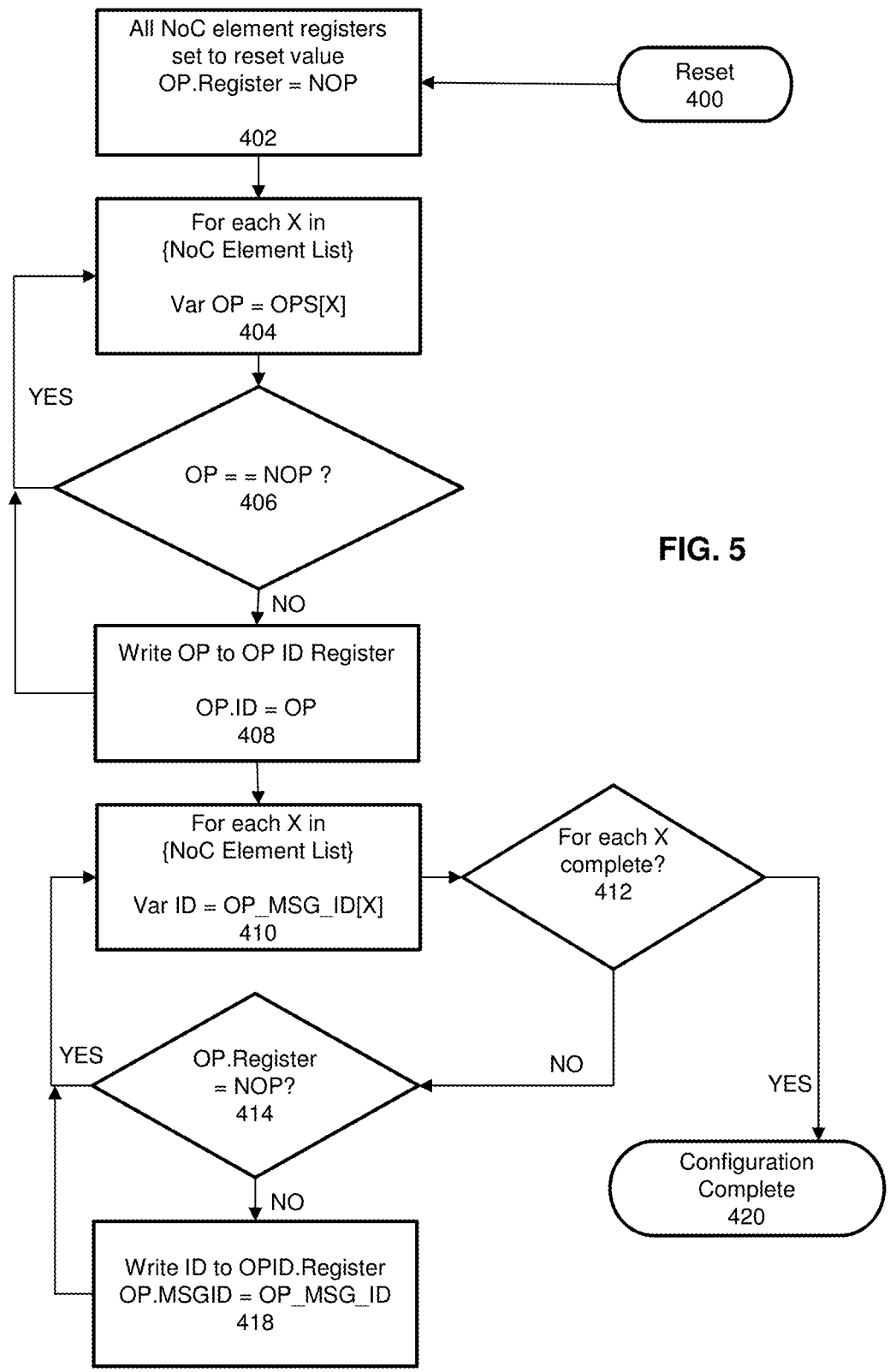
FIG. 5 shows a process of updating registers for the system of FIG. 3. in accordance with the various aspects and embodiments of the invention.

Referring now to FIG. 5, the system with the NoC is reset at 400. The process moves to step 402 and all NoC element registers are set to NOP. At step 404, for each element in the NoC element list, variable OP=OPS[X]. The variable OP is assigned with the value from the array of operations, OPS. The index into the array is the index of the NOC element, X. At step 406, the process determines if OP==NOP. If so, then the process returns to step 404. If not, then the process moves to step 408 and operation (OP) is written to the NoC element's operation identification register REG: OP_ID 43, such that OP.ID=OP. At step 410 the process is repeated for each variable (X) in the NoC element list so that the variable ID=OP_MSG_ID[X]. The variable ID is assigned with the value from the array of message ID's, OP_MSG_ID. The index into the array is the index of the NOC element, X. The process continues to step 412 to determine if the process of step 410 has been complete for each X. If so, then at step 420 the configuration of the NoC is complete. If not, then the process proceeds to step 414 and the configuration procedures determines if the OP.Register=NOP. If yes, then the process returns to step 410. If not, then the process proceeds to step 418 and the ID is written to the OPID.Register, such that OP.MSGID=OP_MSG_ID for the NoC elements.

Referring in general to Intellectual Properties (IPs) that communicate across using the NoC in accordance with the present invention. IPs include initiators and targets that communicate using the NoC. Targets and initiators have interfaces, an agent interface unit, which performs the function of interfacing to one or more agents. Agents may be fully coherent, IO-coherent, or non-coherent. The interface between an agent interface unit and its associated agent uses a protocol. The Advanced Microcontroller Bus Architecture (AMBA), Advanced eXtensible Interface (AXI), Coherency Extensions (ACE) is one such protocol. In some cases, an agent may interface to more than one agent interface unit. In some such cases, each agent interface unit supports an interleaved or hashed subset of the address space for the agent. Also, in accordance with the present invention, memory interface unit are in communication with the NoC and perform the function of interfacing to all or a portion of the next level of the memory hierarchy.

According to another aspect of the invention, each type of unit can be implemented as multiple separate instances. A typical system has one agent interface unit associated with each agent, one memory interface unit associated with each of a number of main memory storage elements, and some number of coherence controllers, each responsible for a portion of a memory address space in the system.

In accordance with some aspects of the invention, there does not need to be a fixed relationship between the number of instances of any type and any other type of unit in the system. A typical system has more agent interface units than memory interface units, and a number of coherence controllers that is in a range close to the number of memory interface units. In general, a large number of coherent agents in a system, and therefore a large number of agent interface units implies large transaction and data bandwidth requirements, and therefore requires a large number of coherence controllers to receive and process coherence commands and to issue snoop requests in parallel, and a large number of memory interface units to process memory command transactions in parallel.

The invention can be embodied in a physical separation of logic gates into different regions of a chip floorplan. The actual placement of the gates of individual, physically separate units might be partially mixed, depending on the floorplan layout of the chip, but the invention is embodied in a chip in which a substantial bulk of the gates of each of a plurality of units is noticeably distinct within the chip floorplan.

The invention can be embodied in a logical separation of functionality into units. Units for agent interface units, coherence controller units, and memory interface units may have direct point-to-point interfaces. Alternatively, communication between units may be performed through a communication hub unit.

The invention, particularly in terms of its aspect of separation of function into units, is embodied in systems with different divisions of functionality. The invention can be embodied in a system where the functionality of one or more of the agent interface units, coherence controller units, and memory interface units are divided into sub-units, e.g. a coherence controller unit may be divided into a request serialization sub-unit and a snoop filter sub-unit. The invention can be embodied in a system where the functionality is combined into fewer types of units, e.g. the functionality from a coherence controller unit can be combined with the functionality of a memory interface unit. The invention can be embodied in a system of arbitrary divisions and combinations of sub-units.

Some embodiments of a cache coherent system according to the invention have certain functionality between an agent and its agent interface unit. The functionality separates coherent and non-coherent transactions. Non-coherent transactions are requested on an interface that is not part of the cache coherent system, and only coherent transactions are passed to the agent interface unit for communication to coherence controller units. In accordance with some embodiments of the invention, the function of separating coherent and non-coherent transactions is present within the agent interface unit.

In accordance with some aspects and some embodiments of the invention, one or more agent interface units communicate with IO-coherent agents, which themselves have no coherent caches, but require the ability to read and update memory in a manner that is coherent with respect to other coherent agents in the system using a direct means such as transaction type or attribute signaling to indicate that a transaction is coherent. In some aspects and embodiments, one or more agent interface units communicate with non-coherent agents, which themselves have no coherent caches, but require the ability to read and update memory that is coherent with respect to other coherent agents in the system using an indirect means such as address aliasing to indicate that a transaction is coherent. For both IO-coherent and non-coherent agents, the coupled agent interface units provide the ability for those agents to read and update memory in a manner that is coherent with respect to coherent agents in the system. By doing so, the agent interface units act as a bridge between non-coherent and coherent views of memory. Some IO-coherent and non-coherent agent interface units may include coherent caches on behalf of their agents. In accordance with some embodiments of the invention, a plurality of agents communicate with an agent interface unit by aggregating their traffic via a multiplexer, transport network or other means. In doing so, the agent interface unit provides the ability for the plurality of agents to read and update memory in a manner that is coherent with respect to coherent agents in the system. In some aspects and embodiments, different agent interface units communicate with their agents using different transaction protocols and adapt the different transaction protocols to a common transport protocol in order to carry all necessary semantics for all agents without exposing the particulars of each agent's interface protocol to other units within the system. Furthermore, in accordance with some aspects as captured in accordance with some embodiments of the invention, different agent interface units interact with their agents according to different cache coherence models, while adapting to a common model within the coherence system. By so doing, the agent interface unit is a translator that enables a system of heterogeneous caching agents to interact coherently.

In accordance with some aspects of the invention, some embodiments include more than one coherence controller, each coherence controller is responsible for a specific part of the address space, which may be contiguous, non-contiguous or a combination of both. The transport network routes transaction information to a particular coherence controller as directed by sending units. In accordance with some embodiments of the invention, the choice of coherence controller is done based on address bits above the address bits that index into a cache line, so that the address space is interleaved with such a granularity that sequential cache line transaction requests to the agent interface unit are sent to alternating coherence controllers. Other granularities are possible.

In other embodiments that capture other aspects of the invention, the choice of coherence controller to receive the requests is determined by applying a mathematical function to the address. This function is known as a hashing function. In accordance with some aspects and some embodiments of the invention, the hashing function causes transactions to be sent to a number of coherence controllers that is not a power of two. The association of individual cache line addresses in the address space to coherence controllers can be any arbitrary assignment; provided there is a one-to-one association of each cache-line address to a specific coherence controller.

According to some aspects and embodiments, coherence controllers perform multiple system functions beyond receiving transaction requests and snoop responses and sending snoop requests, memory transactions, and transaction responses. Some such other functions include snoop filtering, exclusive access monitors, and support for distributed virtual memory transactions.

In accordance with some aspects, embodiments that comprise more than one memory interface unit, each memory interface unit is responsible for a certain part of the address space, which may be contiguous, non-contiguous or a combination of both. For each read or write that requires access to memory, the coherence controller (or in accordance with some embodiments of the invention, also the agent interface unit) determines which memory interface unit from which to request the memory access. In accordance with some embodiments of the invention the function is a simple decoding of address bits above the address bits that index into a cache line, but it can be any function, including ones that support numbers of memory interface units that are not powers of two.

In accordance with some embodiments of the invention, agent interface units may have a direct path through the transport network to memory interface units for non-coherent transactions. Data from such transactions may be cacheable in an agent, in an agent interface unit, or in a memory interface unit. Such data may also be cacheable in a system cache or memory cache that is external to the cache coherence system.

The approach to chip design of logical and physical separation of the functions of agent interface, coherence controller, and memory interface enables independent scaling of the multiplicity of each function from one chip design to another. That includes both logical scaling and physical scaling. This allows a single semiconductor IP product line of configurable units to serve the needs of different chips within a family, such as a line of mobile application processor chips comprising one model with a single DRAM channel and another model with two DRAM channels or a line of internet communications chips comprising models supporting different numbers of Ethernet ports. Furthermore, such a design approach allows a single semiconductor IP product line of configurable units to serve the needs of chips in a broad range of application spaces, such as simple consumer devices as well as massively parallel multiprocessors.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, therefore, is not intended to be limited to the various aspects and embodiments discussed and described herein. Rather, the scope and spirit of invention is embodied by the appended claims.

What is claimed is:

1. A method for stream processing of a packet, the packet including a header section having a message identification, a non-data payload section having an operation identification, and data payload section, the method comprising:
   receiving the packet at a network-on-chip (NoC) element in a Network-on-Chip (NoC);
   retrieving the message identification;
   analyzing the message identification to determine an operation, as defined by the operation identification, that should be performed on the data payload section;
   selecting the operation, if the data payload is to be processed, from a plurality of operations;
   performing the operation on the data payload during transportation of the packet to improving latency; and
   overriding the non-data payload section per an operation code.

2. The method of claim 1, wherein the step of analyzing the message identification includes the step of comparing the message identification of the packet with an identifier of the NoC element to determine if there is a match.

3. The method of claim 1, further comprising routing the data payload to a functional unit that performs the operation.

4. The method of claim 3, wherein the operation performs gray scale to binary conversion.

5. The method of claim 1, wherein no operation is performed and the method further comprises routing the packet through the NoC.

6. The method of claim 5 further comprising routing the data payload of the packet to the functional unit for processing.

7. The method of claim 1, wherein the NoC element is a switch.

8. The method of claim 1 wherein the operation is parallel computation including OpenMP.

9. The method of claim 1, wherein the operation is image recognition processing using thresholding.

10. The method of claim 1, wherein the operation includes backpropagation using gradient descent in an artificial neural network.

11. A method for performing an operation on a packet being transported through a Network-on-Chip (NoC), the method comprising:
   receiving a packet on a port of a network-on-chip (NoC) element in the NoC, the packet including a header section, a non-data payload section, and a data payload section;
   determining, using a comparator, if there is a match between a message identification in the header of the packet and a message identification of the NoC element;
   routing, if there is a match, the data payload to the NoC element;
   operating on the data payload section using an operation associated with an operation identification of the non-data payload section;
   overriding the non-data payload section per an operation code; and
   routing the packet through the NoC element to reduce the latency associated with the packet.

12. The method of claim 11, wherein the NoC is part of an artificial intelligent system.

13. The method of claim 11, wherein the NoC is part of an artificial neural network.

* * * * *